United States Patent
Schumacher

(10) Patent No.: US 11,965,700 B2
(45) Date of Patent: Apr. 23, 2024

(54) HEAT EXCHANGER FOR COOLING MULTIPLE FLUIDS

(71) Applicant: Modine Manufacturing Company, Racine, WI (US)

(72) Inventor: Tobias Schumacher, Walddorfhäslach (DE)

(73) Assignee: Modine Manufacturing Company, Racine, WI (US)

( * ) Notice: Subject to any disclaimer, the term of this patent is extended or adjusted under 35 U.S.C. 154(b) by 421 days.

(21) Appl. No.: 17/297,147

(22) PCT Filed: Nov. 4, 2019

(86) PCT No.: PCT/US2019/059674
§ 371 (c)(1),
(2) Date: May 26, 2021

(87) PCT Pub. No.: WO2020/112304
PCT Pub. Date: Jun. 4, 2020

(65) Prior Publication Data
US 2022/0026159 A1   Jan. 27, 2022

Related U.S. Application Data

(60) Provisional application No. 62/771,769, filed on Nov. 27, 2018.

(51) Int. Cl.
*F28D 9/00* (2006.01)
*F01M 5/00* (2006.01)
(Continued)

(52) U.S. Cl.
CPC .......... *F28D 9/0093* (2013.01); *F28D 9/005* (2013.01); *F28F 9/0221* (2013.01); *F01M 5/002* (2013.01); *F16H 57/0415* (2013.01); *F28F 3/044* (2013.01)

(58) Field of Classification Search
CPC ...... F28D 9/0093; F28D 9/005; F28F 9/0221; F28F 3/044; F01M 5/002; F16H 57/0415
(Continued)

(56) References Cited

U.S. PATENT DOCUMENTS 4,002,201 A * 1/1977 Donaldson ................ F28F 3/04
165/166
5,462,113 A * 10/1995 Wand .................... F28D 9/0093
165/140

(Continued)

FOREIGN PATENT DOCUMENTS

CA         2366332 A1     6/2003
CN       104641199 A     5/2015
(Continued)

OTHER PUBLICATIONS

Office Action issued from the Chinese Patent Office for related Application No. 201980086009.X dated Aug. 16, 2022 (14 Pages including English Translation).

(Continued)

*Primary Examiner* — Justin M Jonaitis
(74) *Attorney, Agent, or Firm* — Michael Best & Friedrich

(57) ABSTRACT

A heat exchanger having a stack of nested shells joined to a base plate includes two coolant manifolds and four fluid manifolds extending through the stack. The coolant manifolds extend the entire length of the stack in the stacking direction. Two of the fluid manifolds extend from one end of the stack to an intermediate location along the stacking direction, and the other two fluid manifolds extend from the other end of the stack to the intermediate location. Fluid transfer conduits extend through the stack, from a face of the base plate opposite the stack to the fluid manifolds at the end of the stack opposite the base plate, in order to transfer fluid (Continued)

to and from fluid flow passages extending between those fluid manifolds at that end of the stack.

20 Claims, 3 Drawing Sheets

(51) Int. Cl.
*F16H 57/04* (2010.01)
*F28F 3/04* (2006.01)
*F28F 9/02* (2006.01)

(58) Field of Classification Search
USPC .......................................................... 165/140
See application file for complete search history.

(56) References Cited

U.S. PATENT DOCUMENTS

| | | | | |
|---|---|---|---|---|
| 5,896,834 | A * | 4/1999 | Gruner | F28D 9/0093 123/196 AB |
| 5,964,280 | A * | 10/1999 | Wehrmann | F28F 9/0246 165/145 |
| 6,305,466 | B1 * | 10/2001 | Andersson | F28D 9/005 165/DIG. 371 |
| 2012/0234523 | A1 * | 9/2012 | Jouanny | F28F 9/0246 165/166 |
| 2015/0369115 | A1 * | 12/2015 | Kim | F28F 27/02 165/103 |
| 2016/0282053 | A1 | 9/2016 | Bardeleben et al. | |
| 2016/0320141 | A1 * | 11/2016 | Barfknecht | F28F 9/026 |
| 2016/0356205 | A1 | 12/2016 | Braun et al. | |
| 2019/0063846 | A1 * | 2/2019 | Bluetling | F28D 9/0093 |

FOREIGN PATENT DOCUMENTS

| | | |
|---|---|---|
| CN | 106091482 A | 11/2016 |
| CN | 105486125 B | 6/2018 |
| JP | 2004093107 A | 3/2004 |
| WO | 2011084613 A2 | 7/2011 |
| WO | 2015042721 A1 | 5/2015 |
| WO | 2017214478 A1 | 12/2017 |

OTHER PUBLICATIONS

International Search Report with Written Opinion for related Application No. PCT/US2019/059674 dated Jan. 17, 2020 (6 Pages).

* cited by examiner

HEAT EXCHANGER FOR COOLING MULTIPLE FLUIDS

CROSS-REFERENCE TO RELATED APPLICATIONS

This application claims priority to U.S. Provisional Patent Application No. 62/771,769 filed on Nov. 27, 2018, the entire contents of which are hereby incorporated by reference in their entirety.

BACKGROUND

The invention relates to liquid-to-liquid heat exchangers, and particularly to heat exchangers that transfer heat between a flow of liquid coolant and two or more flows of liquids. Heat exchangers of this type include, but are not limited to, oil coolers.

Heat exchange systems to regulate the temperature of fluids to be above a minimum threshold, below a maximum threshold, or within a desirable range bounded by a minimum and a maximum threshold are known. Such heat exchange systems typically include one or more heat exchangers. Vehicle powertrains in particular require such heat exchange systems in order to properly regulate the temperature of working fluid such as coolant, engine oil, transmission oil, and the like.

Heat exchangers constructed with a stack of nested plates, such as for example liquid-cooled oil coolers for automotive applications, are known. Such oil coolers are often constructed with a relatively rigid mounting baseplate, and it can be advantageous for the inlet and/or the outlet of at least one of the fluids (typically the oil) to pass through the baseplate.

In some cases it may be desirable to use a single heat exchanger to cool two or more fluid flows, such as two or more different and/or hydraulically separate flows of oil. In such cases, the routing of the multiple fluid flows between the desired inlet and outlet locations for each fluid flow and the flow passages within the heat exchanger can be complicated, leading to increased costs and/or decreased heat transfer efficiency.

SUMMARY

It is at least one object of the invention to provide a heat exchanger capable of transferring heat between a flow of liquid coolant and two or more fluids, with improved routing of the fluids between fluid inlet and outlets and fluid flow passages within the heat exchanger.

According to at least some embodiments of the invention, a heat exchanger having a stack of nested shells joined to a base plate includes two coolant manifolds and four fluid manifolds extending through the stack. The coolant manifolds extend the entire length of the stack in the stacking direction, from a first end where the base plate is mounted to a second end where a cap plate is joined to the stack. Two of the fluid manifolds extend from the first end to an intermediate location along the stacking direction, and the other two fluid manifolds extend from the second end to the intermediate location.

The coolant manifolds are fluidly connected within the stack by coolant flow passages that are formed between nested shells of the stack. Fluid flow passages are also formed between the nested shells of the stack and are interleaved with the coolant flow passages. The two fluid manifolds that extend from the first end to the intermediate location are fluidly connected by those ones of the fluid flow passages that are arranged between the first end and the intermediate location. The two fluid manifolds that extend from the second end to the intermediate location are fluidly connected by those ones of the fluid flow passages that are arranged between the second end and the intermediate location.

At least one fluid transfer conduit extends from a face of the base plate opposite the stack of nested shells to one of the fluid manifolds that is arranged between the second end of the stack and the intermediate location. In some embodiments, the fluid transfer conduit includes a first section and a second section. The first section extends in the stacking direction of the stack of nested shells. In some embodiments, the second section is formed into the cap plate. In some such embodiments the second section is at least partially defined by an elongated bulge in the cap plate. In some such embodiments the elongated bulge has an arcuate cross-section.

In some embodiments, one or both of the fluid manifolds that are arranged between the first end of the stack and the intermediate location extend through the base plate.

In some embodiments, two fluid transfer conduits extend from the face of the base plate opposite the stack of nested shells. Each of the fluid transfer conduits extends from that face of the base plate to one of the two fluid manifolds that are arranged between the second end of the stack and the intermediate location.

In some embodiments, one of the fluid manifolds that are arranged between the first end of the stack and the intermediate location is aligned with one of the fluid manifolds that is arranged between the second end of the stack and the intermediate location. In some such embodiments each one of the fluid manifolds is aligned with another one of the fluid manifolds.

In some embodiments, those ones of the fluid manifolds that are aligned with one another are separated by a flow barrier. In at least some embodiments the flow barrier is formed into one or more of the nested shells. In some particular embodiments the flow barrier is formed by two successive ones of the shells in the stack.

In at least some embodiments the coolant manifolds and the fluid manifolds are formed by aligned apertures of the nested shells. In some embodiments the apertures are arranged at corners of the shells.

In some embodiments, the shells have a rectangular shape with a long direction and a short direction. In at least some such embodiments a fluid transfer conduit of is arranged at opposing ends of the stack in the long direction.

According to some embodiments of the invention, a fluid transfer conduit extending through a stack of nested shells is at least partially defined by aligned apertures of the shells. Each of the aligned apertures is surrounded by an upturned flange that nests with the upturned flanges of the adjacent shells.

DETAILED DESCRIPTION

Figure 1:
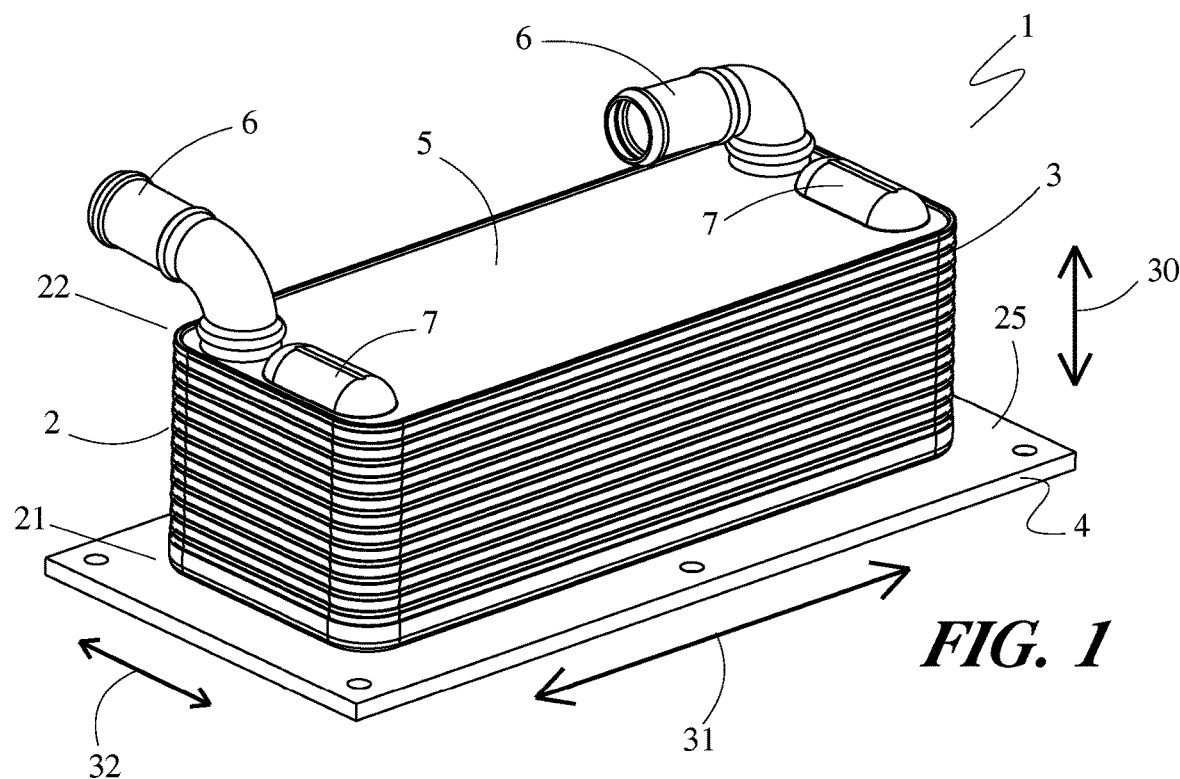
FIG. 1 is s perspective view of a heat exchanger according to some embodiments of the invention.
Figure 2:
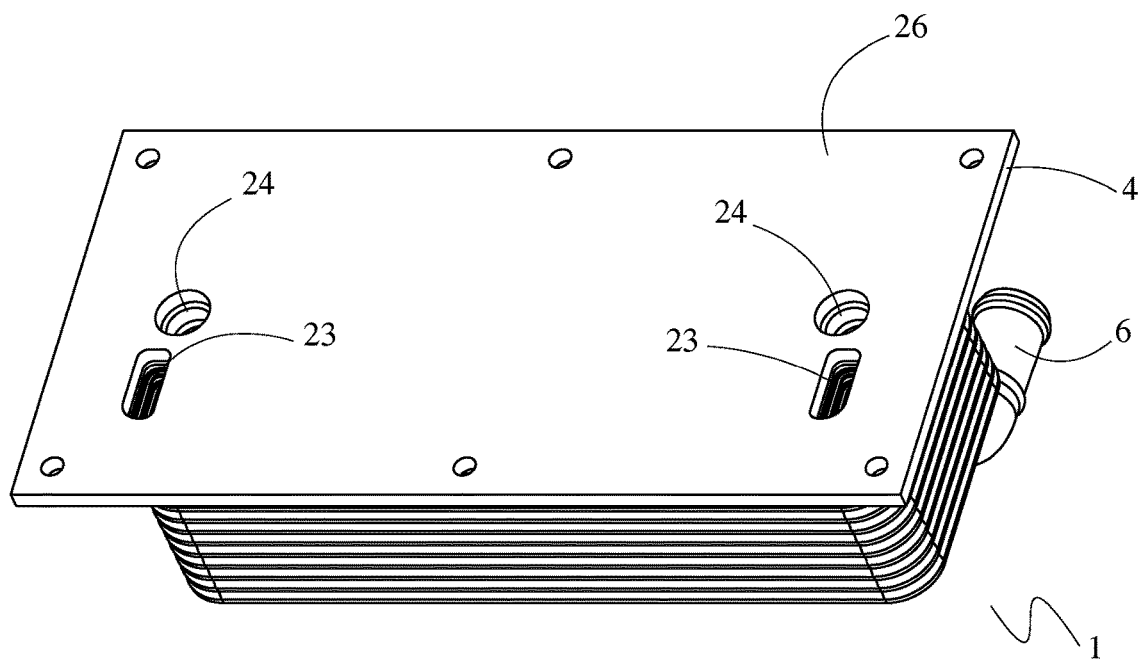
FIG. 2 is another perspective view of the heat exchanger of FIG. 1.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

A heat exchanger 1, depicted in FIGS. 1-6, is an oil cooler that is configured to exchange heat between a flow of liquid coolant and two separate oil flows. One or both of the two separate oil flows can be a flow of engine oil. Alternatively, one or both of the two separate oil flows can be a flow of transmission oil. In some applications one or both of the two separate oil flows can be a dielectric oil used to cool components in an electric or hybrid electric vehicle. It should be understood, however, that the heat exchanger 1 can be used to transfer heat between the flow of liquid coolant and any two other fluid flows, and that the fluids to be cooled need not be oil flows.

The heat exchanger 1 is constructed using nested shells 3 that are stamped from thin sheets of heat-conducting material such as aluminum, copper, steel, etc. The shells 3 nest together to form a stack 2 extending in a stacking direction 30. The shells 3 are each provided with an upturned peripheral flange 27 to accomplish the desired nesting arrangement. The flanges 27 are arranged at an angle, so that spaces for fluid flow are provided between adjacent ones of the shells 3 when the stack 2 is assembled. These spaces alternatingly define coolant flow passages 8 and fluid flow passages 9 through the heat exchanger 1. The coolant flow passages 8 and fluid flow passages 9 are interleaved with each other along the stacking direction 30, so that heat can be efficiently transferred between the fluids through the thin conductive shells.

The nested shells 3 are joined to adjacent shells in the stack 2 by brazing. In order to accomplish the brazing, the material from which the shells 3 are formed is preferably provided with a cladding layer of braze alloy on one or both sides of the sheet. During the brazing operation, the assembled heat exchanger 1 is heated to a temperature at which the braze alloy becomes liquid, and is then cooled to solidify the braze alloy and created fluid-tight joints between the parts. Joints between the shells 3 along the peripheral flanges 27 can thereby be created. The shells 3 can also be provided with dimples 28 on the flat surfaces of the shells, in order to provide additional braze joints between adjacent shells. These dimples 28 can additionally enhance the rate of heat transfer by providing beneficial turbulation of the coolant and/or fluid flows.

The assembled stack 2 extends in the stacking direction from a first end 21 to a second end 22. A base plate 4 is arranged at the end 21, and a top face 25 of the base plate 4 is joined to the end 21 of the stack 2, preferably during the same brazing operation as the one that joins together the shells 3. Similarly, a cap plate 5 is provided at the end 22 and is joined to the stack 2 at that end.

The shells 3 are formed in a generally rectangular shape, with a long direction 31 and a short direction 32. It should be understood that the directions 31 and 32 are referred to as "long" and "short" for ease of description of the exemplary heat exchanger 1 as depicted in the figures. It would be equally feasible for the shells to have an equal dimension in both directions. Coolant and fluid manifolds are provided at the four corners of the stack 2 to provide fluid communication to the coolant and fluid flow passages 8 and 9. These manifolds are formed through the use of apertures 17 that are arranged at the corners of the shells 3. The apertures 17 are located within locally deformed regions of the shells 3, so that the deformed regions of adjacent shells 3 are joined together along the periphery of the apertures 17 in order to provide fluid communication between the manifold and alternating fluid spaces between adjacent shells.

At two of the corners of the stack, the apertures 17 define coolant manifolds 10 that extend from the first end 21 to the second end 22. The coolant manifolds 10 are fluidly connected by the coolant flow passages 8. Two coolant ports 6 are arranged on the cap plate 5, each being in fluid communication with one of the coolant manifolds 10. The heat exchanger 1 can be connected to a coolant loop (not shown) by way of these ports 6, so that during operation of the heat exchanger 1 a flow of coolant can be directed through the coolant flow passages 8 of the heat exchanger. One of the coolant manifolds 10 will thereby function as a coolant inlet manifold, and the corresponding one of the coolant ports 6 will be a coolant inlet port. The other one of the coolant manifolds 10 will function as a coolant outlet manifold, and the corresponding one of the coolant ports 6 will be a coolant outlet port.

A fluid manifold 12 for one of the two fluid flows that exchanges heat with the coolant, and a fluid manifold 14 for the other one of the two fluid flows that exchanges heat with the coolant, are arranged at a third one of the corners. The fluid manifolds 12 and 14 are aligned with one another along the stacking direction 30, and are hydraulically separated by a pair of the nested shells 3 from which the aperture 17 is eliminated at that corner. In its place, a barrier 18 is created to maintain the desired hydraulic isolation of the two fluid flows. The pair of nested shells 3 that include the barrier 18 is arranged at an intermediate location along the stacking direction 30 between the first end 21 and the second end 22. The fluid manifold 12 extends from the first end 21 to that intermediate location, and the fluid manifold 14 extends from the second end 22 to that intermediate location.

In a similar fashion, a fluid manifold 13 and a fluid manifold 15 are arranged at a fourth one of the corners. The fluid manifold 13 extends from the first end 21 to the intermediate location, and the fluid manifold 15 extends from the second end 22 to the intermediate location. The manifolds 13, 15 are again separated by a barrier 18 arranged in that corner in the pair of shells 3 that are located at that intermediate location.

Figure 5:
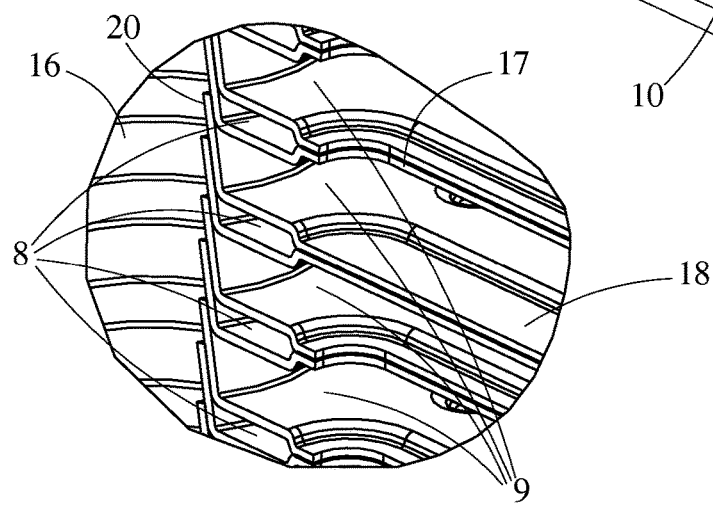
FIG. 5 is a detail view of the portion V-V of FIG. 4.
Figure 6:
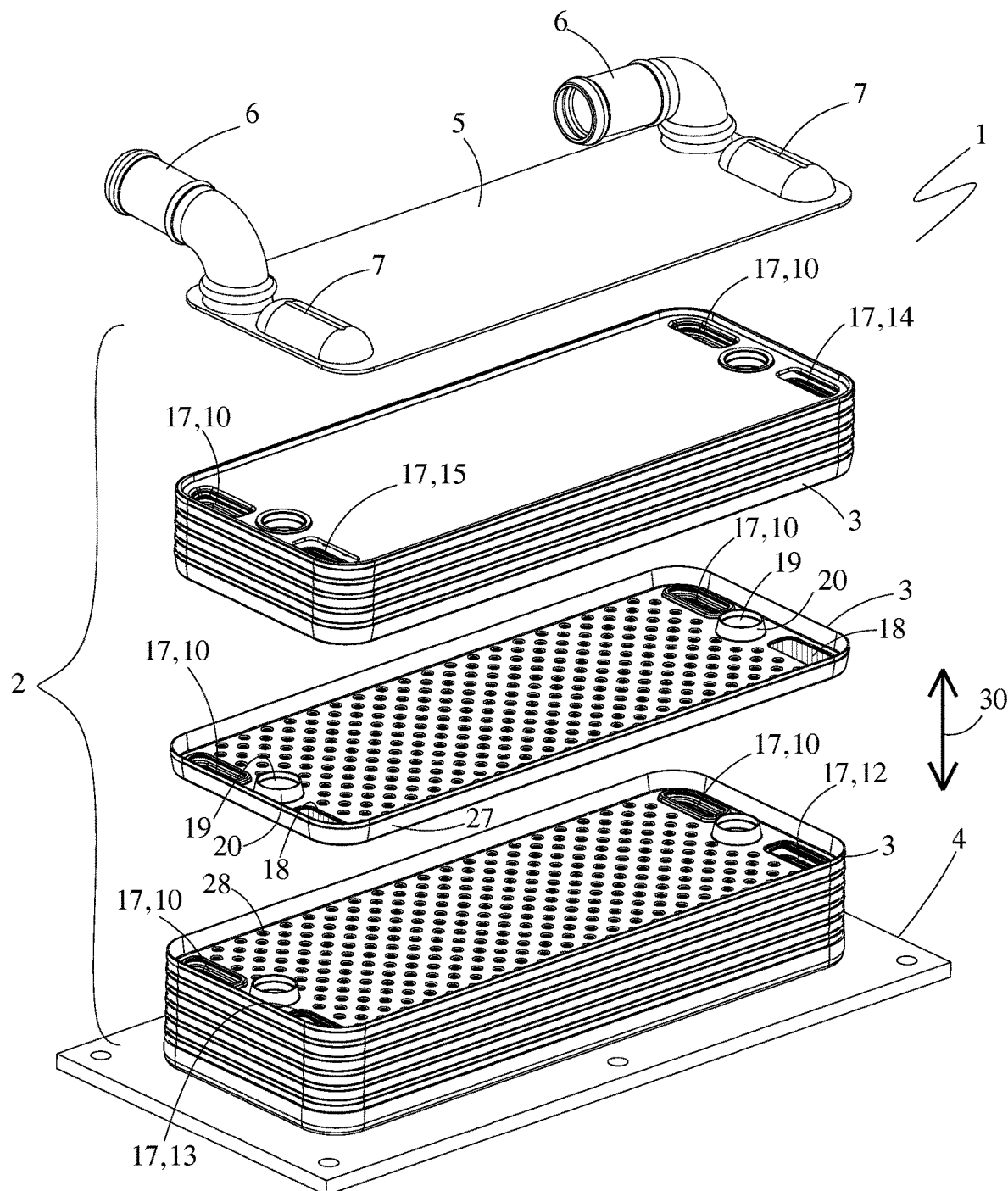
FIG. 6 is an exploded view of the heat exchanger of FIG. 1.

As can be best seen in FIG. 5, the barrier 18 is formed by both of the shells 3 belonging to that pair of shells. However, in some embodiments the barrier 18 can alternatively be formed by only a single one of the shells 3, with the other shell 3 being provided with an aperture 17 at that corner.

The fluid manifold 12 and the fluid manifold 13 are connected by a first subset of the fluid flow passages 9 that are defined between the shells 3, that first subset being those ones of the fluid flow passages 9 that are located between the first end 21 of the stack 2 and the intermediate location. The fluid manifold 14 and the fluid manifold 15 are likewise connected by a second subset of the fluid flow passages 9 that are defined between the shells 3, that second subset being those ones of the fluid flow passages 9 that are located between the second end 22 of the stack 2 and the intermediate location. One of the coolant flow passages 8 is defined between the two shells 3 of the pair of shells that include the barrier 18, and that one of the coolant flow passages 8 exchanges heat with one of the fluid flow passages 9 of the first subset and with one of the fluid flow passages 9 of the second subset.

The location of the barrier 18 along the stacking direction 30 can be adjusted as needed for the particular application. In some embodiments, it may be preferable for the barrier 18 to be arranged midway between the ends 21, 22 so that the quantity of fluid flow passages 9 in the first subset is equal to the quantity of fluid flow passages 9 in the second subset. In other embodiments it may be preferable for one of the subsets of flow passages 9 to have more flow passages than the other subset, in order to accommodate a higher flow rate and/or a need for an increased rate of heat transfer.

Either one of the fluid manifolds 12, 13 can function as an inlet manifold for a first one of the fluid flows, with the other one of the fluid manifolds 12, 13 functioning as an outlet manifold. Similarly, either one of the fluid manifolds 14, 15 can function as an inlet manifold for a second one of the fluid flows, with the other one of the fluid manifolds 12, 13 functioning as an outlet manifold. One or both of the fluid flows can flow through the corresponding subset of fluid flow passages 9 in a direction that is counter to the direction of the coolant flow through the coolant flow passages 8. Alternatively, both of the fluid flows can flow in a common direction as the flow of coolant.

In the exemplary heat exchanger 1, the coolant manifolds 10 are arranged along first common edge of each one of the shells 3 extending in the long direction 31, and the fluid manifolds 12-15 are arranged along a second common edge of each one of the shells 3 extending in the long direction 31. It may be preferable, in other embodiments, for the coolant manifolds 10 to be arranged at diagonally opposing corners instead, and for the fluid manifolds 12-15 to also be arranged at diagonally opposing corners.

Orifices 23 and 24 through which the first and second fluid flows, respectively, are provided on a bottom face 26 of the base plate 4. The bottom face 26 is a second face of the base plate 4 opposite the first (top) face 25, and therefore faces away from the stack 2. By arranging the orifices 23, 24 on this bottom face 26, the fluid connections for the fluid flows can be achieved through the structural mounting of the heat exchanger 1 by way of the base plate 4. The base plate 4 can, to that end, be provided with mounting holes through which mechanical fasteners can be inserted. This mounting arrangement can be especially beneficial when the heat exchanger 1 is provided for the purpose of cooling two separate flows of oil in a vehicular application. In such an application, the heat exchanger 1 can be secured to an engine, transmission, or other portion of the vehicle and can receive the flows of oil directly therefrom, and can return the flows of oil directly thereto. Although not shown, it should be understood that provision can be made around the orifices 23, 24 for gaskets or other fluid seals.

Figure 3:
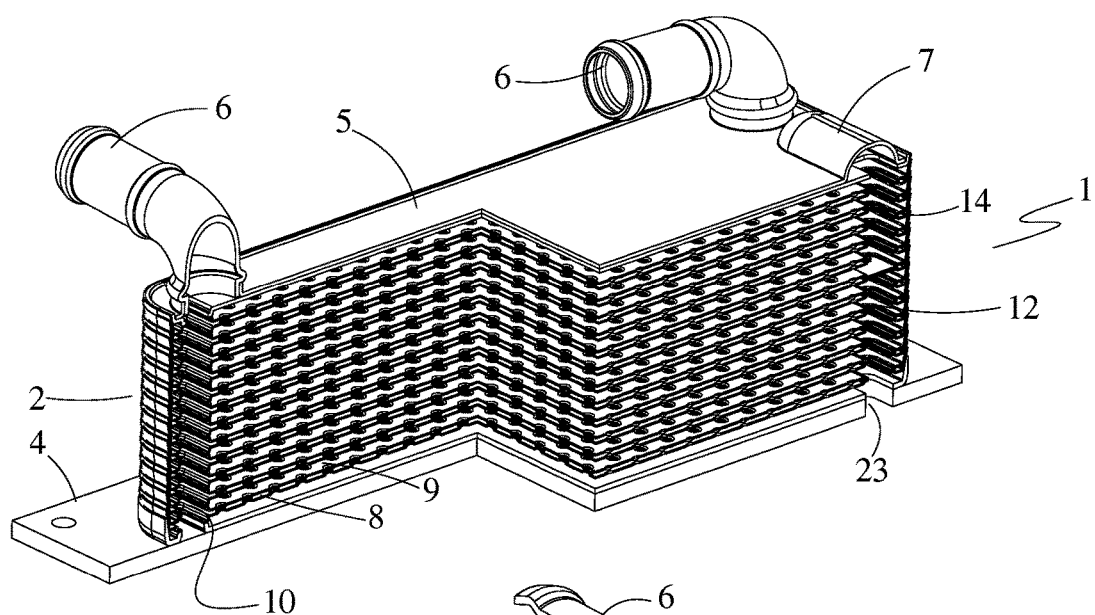
FIG. 3 is the perspective view of the heat exchanger of FIG. 1, sectioned to show certain internal details.
Figure 4:
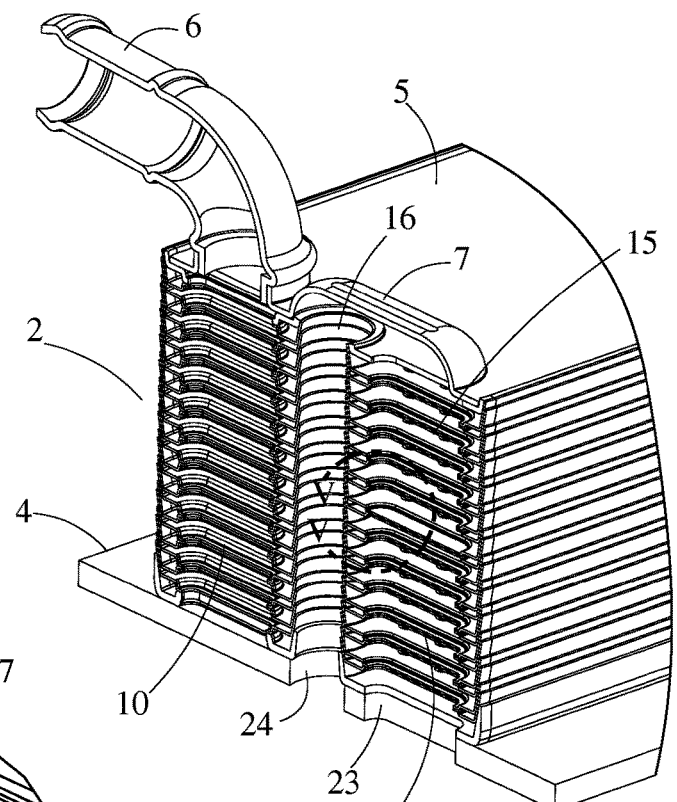
FIG. 4 is a partial perspective view of the heat exchanger of FIG. 1, sectioned to show other internal details.

The orifices 23 for the first fluid flow can be arranged to directly communicate with the fluid manifolds 12 and 13, as shown in FIGS. 3 and 4. This allows for the easy routing of fluid to one of the manifolds 12, 13 through one of the orifices 23, and back from the other of the manifolds 12 and 13 through the other of the orifices 23.

Because the manifolds 14 and 15 for the second fluid flow are spaced away from the base plate 4 and are separated therefrom by the manifolds 12 and 13, a pair of fluid transfer conduits 16 are provided to route the fluid between the manifolds 14, 15 and the orifices 24. A first fluid transfer conduit 16 to provide fluid flow between one of the orifices 24 and the manifold 15 is depicted in the sectional view of FIG. 4. It should be understood that the second fluid transfer conduit to provide fluid flow between the other one of the orifices 24 and the manifold 14 is similar in design and is arranged at the opposite end of the heat exchanger 1.

As depicted in FIG. 4, the fluid transfer conduit 16 includes a first section that extends through the stack 2 in the stacking direction 30. The first section is at least partially defined by aligned apertures 19 of the shells 3. Each of the apertures 19 is surrounded by an upturned flange 20, similar to the peripheral flanges 27, so that when the shells 3 are stacked together the flanges 20 of adjacent shells nest to form a fluid conduit through the stack 2 that is hydraulically sealed off from both the flow passages 8 and the flow passages 9.

The second section of the fluid transfer conduit 16 extends along the cap plate 5 to provide fluid communication between the first section of the fluid transfer conduit 16 and the fluid manifold 14 or 15. An elongated bulge 7 is formed into the cap plate 5 to at least partially define the second section. The elongated bulge 7 is provided with an arcuate cross-section in order to facilitate fluid flow with minimal pressure drop, and to provide increased pressure resistance. The second fluid passes between the bulge 7 and a top surface of the uppermost shell 3 in flowing to/from the first section of the fluid transfer conduit 16 and an aperture 17 of the uppermost shell.

In order to minimize any blockages to fluid flow within the fluid flow passages 9, the apertures 19 that define the first section of the fluid transfer conduits 16 can be arranged between the apertures 17 of the shells 3 along the edges that extend in the short direction 32.

The orifices 24 are arranged to be in-line with the apertures 19. In some cases, it may be desirable or necessary for the orifices 24 to be arranged in other locations along the face 26. By way of example, the location of the fluid flow ports on the interfacing part might dictate the placement to be in particular locations. In such circumstances, the fluid transfer conduits 16 can include an additional section that extends through the base plate 4 in a non-linear fashion. It can be especially advantageous to construct the base plate 4 out of multiple plate pieces in order to provide such a flow routing.

While the apertures 19 are depicted as being circular, in some embodiments it may be more preferable for the apertures 19 (and the associated flanges 20) to have another shape. For example, the shape can be such as to maximize the flow cross-sectional area through the first section of the flow conduit 16.

It should be understood that, while reference herein to the use of the heat exchanger 1 has primarily focused on cooling the first and second fluids by transferring heat to the coolant, it is also possible to use the heat exchanger 1 to transfer heat from the coolant to one or both of the fluids.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A heat exchanger comprising:
a stack of nested shells extending in a stacking direction from a first end to a second end;
a base plate arranged at the first end, the stack of nested shells being mounted to a first face of the base plate;
a cap plate arranged at the second end and joined to the stack of nested shells;
a first and a second coolant manifold extending through the stack of nested shells from the first end to the second end;
a plurality of coolant flow passages formed between nested shells of the stack to fluidly connect the first and second coolant manifolds;
a plurality of fluid flow passages formed between nested shells of the stack, the plurality of fluid flow passages being interleaved with the plurality of coolant flow passages;
a first and a second fluid manifold extending through the stack of nested shells from the first end to an intermediate location between the first end and the second end along the stacking direction, the first and second fluid manifolds being fluidly connected by those ones of the fluid flow passages that are located between the first end and the intermediate location, the first and second fluid manifolds additionally extending through the base plate from the first face to a second face of the base plate opposite the first face;
a third and a fourth fluid manifold extending through the stack of nested shells from the second end to the intermediate location, the third and fourth fluid manifolds being fluidly connected by those ones of the fluid flow passages that are located between the second end and the intermediate location; and
a first and a second fluid transfer conduit extending through the base plate to the third and fourth fluid manifolds respectively, each of the first and second fluid transfer conduits including a first section extending in the stacking direction through the stack of nested shells, and a second section formed into the cap plate.

2. A heat exchanger comprising:
a stack of nested shells extending in a stacking direction from a first end to a second end;
a base plate arranged at the first end, the stack of nested shells being mounted to a first face of the base plate;
a cap plate arranged at the second end and joined to the stack of nested shells;
a first and a second coolant manifold extending through the stack of nested shells from the first end to the second end;
a plurality of coolant flow passages formed between nested shells of the stack to fluidly connect the first and second coolant manifolds;
a plurality of fluid flow passages formed between nested shells of the stack, the plurality of fluid flow passages being interleaved with the plurality of coolant flow passages;
a first and a second fluid manifold extending through the stack of nested shells from the first end to an intermediate location between the first end and the second end along the stacking direction, the first and second fluid manifolds being fluidly connected by those ones of the fluid flow passages that are located between the first end and the intermediate location, the first and second fluid manifolds additionally extending through the base plate from the first face to a second face of the base plate opposite the first face;
a third and a fourth fluid manifold extending through the stack of nested shells from the second end to the intermediate location, the third and fourth fluid manifolds being fluidly connected by those ones of the fluid flow passages that are located between the second end and the intermediate location; and
a first and a second fluid transfer conduit extending from the second face to the third and fourth fluid manifolds respectively, each of the first and second fluid transfer conduits including a first section extending in the stacking direction through the stack of nested shells, and a second section formed into the cap plate,
wherein the second section of the first fluid transfer conduit and the second section of the second fluid transfer conduit are each at least partially defined by an elongated bulge formed into the cap plate.

3. The heat exchanger of claim 2, wherein the elongated bulge has an arcuate cross-section.

4. The heat exchanger of claim 1, wherein the third fluid manifold is aligned with the first fluid manifold and the fourth fluid manifold is aligned with the second fluid manifold.

5. The heat exchanger of claim 4, wherein first and the third fluid manifolds are separated by a first flow barrier and the second and the fourth fluid manifolds are separated by a second flow barrier, each of the first and second flow barriers being formed into at least one of the nested shells.

6. The heat exchanger of claim 1, wherein the first and second coolant manifolds and the first, second, third, and fourth fluid manifolds are each defined by aligned apertures of the nested shells.

7. The heat exchanger of claim 6, wherein the nested shells have a rectangular shape and wherein said apertures are arranged at corners of the nested shells.

8. The heat exchanger of claim 7, wherein each one of the nested shells has a long direction and a short direction and wherein the first section of the first fluid transfer conduit and the first section of the second fluid transfer conduit are arranged at opposing ends of the stack in the long direction.

9. The heat exchanger of claim 8, wherein the first section of the first fluid transfer conduit is arranged between the first coolant manifold and the first and third fluid manifolds and wherein the first section of the second fluid transfer conduit is arranged between the second coolant manifold and the second and fourth fluid manifolds.

10. The heat exchanger of claim 1, wherein the first section of the first fluid transfer conduit and the first section of the second fluid transfer conduit are each at least partially defined by aligned apertures of the nested shells, each of said apertures being surrounded by an upturned flange that nests with the upturned flanges of the adjacent shells to hydraulically separate the first sections from the plurality of coolant flow passages and the plurality of fluid flow passages.

11. The heat exchanger of claim 1, wherein the plurality of fluid flow passages includes a first quantity of fluid flow passages located between the first end and the intermediate location and a second quantity of fluid flow passages located between the second end and the intermediate location, wherein the second quantity is equal to the first quantity.

12. The heat exchanger of claim 1, further comprising:
   a coolant inlet port arranged on the cap plate and in fluid communication with one of the first and second coolant manifolds; and
   a coolant outlet port arranged on the cap plate and in fluid communication with another of the first and second coolant manifolds;
   wherein the second section of the first fluid transfer conduit and the second section of the second fluid transfer conduit are each at least partially defined by an elongated bulge formed into the cap plate.

13. The heat exchanger of claim 2, wherein the third fluid manifold is aligned with the first fluid manifold and the fourth fluid manifold is aligned with the second fluid manifold.

14. The heat exchanger of claim 13, wherein first and the third fluid manifolds are separated by a first flow barrier and the second and the fourth fluid manifolds are separated by a second flow barrier, each of the first and second flow barriers being formed into at least one of the nested shells.

15. The heat exchanger of claim 2, wherein the first and second coolant manifolds and the first, second, third, and fourth fluid manifolds are each defined by aligned apertures of the nested shells, wherein the nested shells have a rectangular shape and wherein said apertures are arranged at corners of the nested shells.

16. The heat exchanger of claim 15, wherein each one of the nested shells has a long direction and a short direction and wherein the first section of the first fluid transfer conduit and the first section of the second fluid transfer conduit are arranged at opposing ends of the stack in the long direction.

17. The heat exchanger of claim 16, wherein the first section of the first fluid transfer conduit is arranged between the first coolant manifold and the first and third fluid manifolds and wherein the first section of the second fluid transfer conduit is arranged between the second coolant manifold and the second and fourth fluid manifolds.

18. The heat exchanger of claim 2, wherein the first section of the first fluid transfer conduit and the first section of the second fluid transfer conduit are each at least partially defined by aligned apertures of the nested shells, each of said apertures being surrounded by an upturned flange that nests with the upturned flanges of the adjacent shells to hydraulically separate the first sections from the plurality of coolant flow passages and the plurality of fluid flow passages.

19. The heat exchanger of claim 2, wherein the plurality of fluid flow passages includes a first quantity of fluid flow passages located between the first end and the intermediate location and a second quantity of fluid flow passages located between the second end and the intermediate location, wherein the second quantity is equal to the first quantity.

20. The heat exchanger of claim 2, further comprising:
   a coolant inlet port arranged on the cap plate and in fluid communication with one of the first and second coolant manifolds; and
   a coolant outlet port arranged on the cap plate and in fluid communication with another of the first and second coolant manifolds.

* * * * *